(No Model.)
N. H. DAVIS.
CLUTCH AND REVERSIBLE PAWL FOR SEWING MACHINES, &c.
No. 270,893. Patented Jan. 23, 1883.
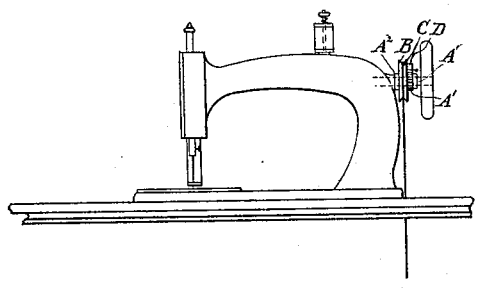
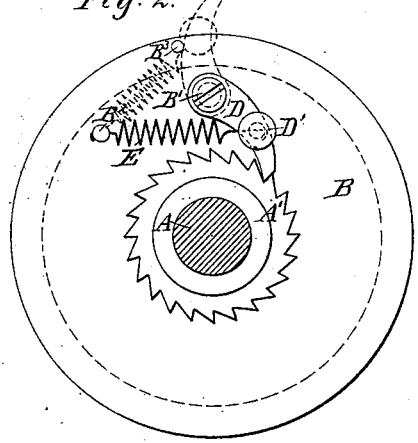
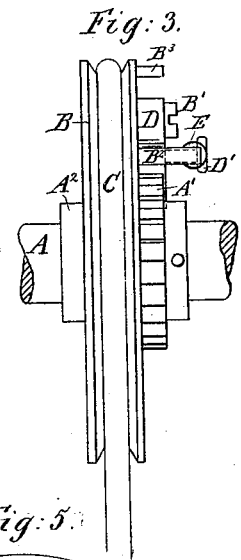
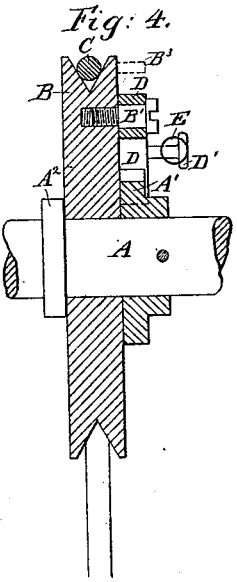
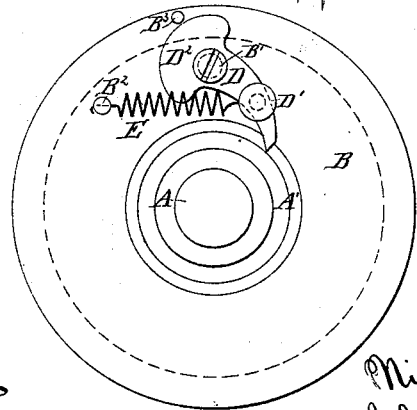
Witnesses:
Inventor:
Nicholas H. Davis.

UNITED STATES PATENT OFFICE.

NICHOLAS H. DAVIS, OF BROOKLYN, NEW YORK.

CLUTCH AND REVERSIBLE PAWL FOR SEWING-MACHINES, &c.

SPECIFICATION forming part of Letters Patent No. 270,893, dated January 23, 1883.

Application filed October 25, 1882. (No model.)

*To all whom it may concern:*

Be it known that I, NICHOLAS H. DAVIS, of Brooklyn, Kings county, in the State of New York, have invented certain new and useful Improvements relating to Clutches for Sewing-Machines and Analogous Machinery, of which the following is a specification.

The invention is intended more particularly for sewing-machines, and will be so described; but the parts may be made in different sizes and applied to machinery generally where it is important to avoid a back motion of the shaft or spindle under any circumstances, and to instantly disconnect and connect at will.

In sewing-machines of many styles it is important not to turn the shaft backward. It is also important to be able to disconnect the parts at will to avoid the liability of mischief from the working of the treadle by children or others when the machine is out of use. My invention provides for attaining both these ends in an unusually simple and efficient manner.

The accompanying drawings form a part of this specification, and represent what I consider the best means of carrying out the invention.

Figure 1 is an elevation of a sewing-machine with the improvement attached. The remaining figures show certain portions on a larger scale. Fig. 2 is an end elevation; Fig. 3, an edge view, and Fig. 4 a section representing the novel parts with so much of the ordinary parts as is necessary to indicate their relation thereto. Fig. 5 is a modification.

Similar letters of reference indicate corresponding parts in all the figures.

A is the shaft of a sewing-machine, as will be understood, carrying attachments (not represented) for communicating motion to the needle, the shuttle, the feed, &c. A' is a ratchet-wheel keyed or otherwise firmly fixed thereon.

$A^2$ is an offset or collar on the shaft.

B is a loosely-mounted pulley, receiving motion through a belt, C, from a fly-wheel (not represented) turned by a treadle, or by any other suitable means. This pulley is liable to be turned in both directions. There are three pins, $B'$ $B^2$ $B^3$, set in one of its faces.

$B'$ is a pin carrying a pawl, D. On the latter is fixed a button, $D'$.

E is a gentle helical spring, of hard brass wire or other suitable material, connecting the pin $B^2$ with the button $D'$.

Referring to Fig. 2, the strong lines show the pawl in position for work. The spring E holds it engaged with the ratchet A'. So long as the pulley B is turned by the belt C in the proper direction for work, the pawl D, being firmly engaged in the ratchet A', turns the shaft with the same effect as if the pulley were keyed thereon; but when from any reason the pulley B is caused to make any backward movement, or movement in the wrong direction, the pawl D clicks backward over the teeth of the ratchet A', and no motion is communicated to the shaft.

The spring E should be of gentle force, so that the pawl in its backward movement will not press on the teeth with sufficient force to turn the shaft.

The above is the position in which the parts are always to be placed for working. So soon as the work is finished and the machine is to be left for a long or short period, the attendant takes hold of the button $D'$, and, lifting the pawl out of engagement with the ratchet A', turns it completely over, so that it lies with its back against the pin or stop $B^3$. The connection of the spring E to the button $D'$ should be sufficiently far out from the face of the wheel to allow the spring to pass the pivot $B'$ freely.

The spring serves to hold the pawl in either position. When the pawl is in position for use, as shown in strong lines, it presses it gently into contact with the ratchet A'. When the pawl is in condition for disuse, as shown in dotted lines, the spring E holds it in contact with the stop $B^3$.

Modifications may be made in the forms of the parts.

Fig. 5 represents a modification which in some cases may be expedient. In this figure, $D^2$ is an arm forming a part of the pawl D, and extending from the central pivot, $B'$, in the direction opposite to the working end of the pawl. It is made heavy and serves to balance the opposite end of the pawl. This may sometimes be of importance in preventing any tendency to displacement of the pawl, either by gravity or by centrifugal force. My experiments indicate no need of such provision. When this form is adopted the loaded part, which I have termed the "arm $D^2$," may be made sufficient to exactly balance the working end of the pawl; but I prefer to make the balance-arm $D^2$ a trifle heavier than the other. The effect of centrifugal force will then be to aid the spring E in holding the pawl in one condition engaged and in the other condition disengaged.

I claim as my invention—

The combination, with the fast ratchet A' and loose pulley B, of a pawl, D, adapted to be thrown into and out of engagement with the ratchet at will, and single spring E, adapted to hold the pawl in either position, as herein specified.

In testimony whereof I have hereunto set my hand, at New York city, this 19th day of October, 1882, in the presence of two subscribing witnesses.

NICHOLAS H. DAVIS.

Witnesses:
M. F. BOYLE,
H. A. JOHNSTONE.